United States Patent
Puschmann et al.

(10) Patent No.: US 10,706,445 B2
(45) Date of Patent: Jul. 7, 2020

(54) METHOD OF BILLING AN ONLINE PURCHASE

(71) Applicant: CLOUD ONE LTD., Tsim Sha Tsui Kowloon (HK)

(72) Inventors: Carsten Puschmann, Essen (DE); Thomas Heidelbach, Haltern am See (DE); Andreas Altenburg, Duesseldorf (DE)

(73) Assignee: CLOUD ONE LTD., Tsim Sha Tsui Kowloon (HK)

(*) Notice: Subject to any disclaimer, the term of this patent is extended or adjusted under 35 U.S.C. 154(b) by 1406 days.

(21) Appl. No.: 14/366,787

(22) PCT Filed: Dec. 20, 2012

(86) PCT No.: PCT/IB2012/002773
§ 371 (c)(1),
(2) Date: Jun. 19, 2014

(87) PCT Pub. No.: WO2013/093606
PCT Pub. Date: Jun. 27, 2013

(65) Prior Publication Data
US 2014/0337184 A1 Nov. 13, 2014

Related U.S. Application Data

(60) Provisional application No. 61/667,973, filed on Jul. 4, 2012, provisional application No. 61/578,254, filed on Dec. 21, 2011.

(30) Foreign Application Priority Data

Dec. 21, 2011 (EP) .................................. 11194763
Jun. 15, 2012 (DE) ..................... 10 2012 105 216

(51) Int. Cl.
*G06Q 30/04* (2012.01)
*G06Q 20/12* (2012.01)
(Continued)

(52) U.S. Cl.
CPC ............. *G06Q 30/04* (2013.01); *G06Q 20/12* (2013.01); *G06Q 20/387* (2013.01);
(Continued)

(58) Field of Classification Search
CPC ............... G06Q 30/04; G06Q 30/0601; G06Q 30/0635; G06Q 20/12; G06Q 20/405; G06Q 20/387; G07G 1/0036
(Continued)

(56) References Cited

U.S. PATENT DOCUMENTS 6,405,176 B1 6/2002 Toohey
8,820,632 B1* 9/2014 West ...................... G06Q 40/00
235/379

(Continued)

FOREIGN PATENT DOCUMENTS

CN 1465022 A 12/2003
CN 1581181 A 2/2005
(Continued)

OTHER PUBLICATIONS

Anonymous, 'Click and Shop' Till You Drop; Prodigy Unveils New Shopping Channel with Expanded Features for Easier Holiday Shopping, Oct. 23, 2000, Business Wire, 2384, pp. 1-2. (Year: 2000).*

*Primary Examiner* — Jason B Dunham
*Assistant Examiner* — Brittany E Bargeon
(74) *Attorney, Agent, or Firm* — Harness, Dickey & Pierce, P.L.C.

(57) ABSTRACT

The present disclosure relates to a method of billing an online purchase of a user by himself or a third party. The
(Continued)

disclosure particularly provides a method for handling a superordinated virtual shopping cart in which articles of different online providers can be accumulated and billed commonly.

12 Claims, 8 Drawing Sheets

(51) Int. Cl.
    *G07G 1/00*     (2006.01)
    *G06Q 30/06*     (2012.01)
    *G06Q 20/38*     (2012.01)
    *G06Q 20/40*     (2012.01)

(52) U.S. Cl.
    CPC ....... *G06Q 20/405* (2013.01); *G06Q 30/0601* (2013.01); *G06Q 30/0635* (2013.01); *G07G 1/0036* (2013.01)

(58) Field of Classification Search
    USPC ...................................................... 705/26.81
    See application file for complete search history.

(56) References Cited

U.S. PATENT DOCUMENTS

| | | |
|---|---|---|
| 2003/0154135 A1 | 8/2003 | Covington et al. |
| 2005/0240472 A1* | 10/2005 | Postrel ............... G06Q 20/06 705/14.23 |
| 2007/0255629 A1* | 11/2007 | Tillman ............... G06Q 20/04 705/26.41 |
| 2010/0169214 A1 | 7/2010 | Nonni et al. |
| 2011/0041163 A1 | 2/2011 | Babi et al. |
| 2011/0231276 A1 | 9/2011 | Yeap et al. |
| 2011/0276414 A1 | 11/2011 | Subbarao et al. |
| 2011/0307389 A1* | 12/2011 | Francia ............... G06Q 20/12 705/67 |
| 2012/0197753 A1* | 8/2012 | Kalin .................. G06Q 30/06 705/26.8 |

FOREIGN PATENT DOCUMENTS

| | | |
|---|---|---|
| CN | 1983320 A | 6/2007 |
| WO | WO-2001027837 A2 | 4/2001 |

* cited by examiner

METHOD OF BILLING AN ONLINE PURCHASE

CROSS-REFERENCE TO RELATED APPLICATIONS

This application is a National Stage of International Application No. PCT/IB2012/002773, filed on Dec. 20, 2012, and published in English as WO 2013/093606 A1 on Jun. 27, 2013. This application claims the benefit and priority of U.S. Provisional Application No. 61/578,254, filed on Dec. 21, 2011, European Application No. 11194763.6, filed on Dec. 21, 2011, German Application No. 10 2012 105 216.6, filed on Jun. 15, 2012, and U.S. Provisional Application No. 61/667,973, filed on Jul. 4, 2012. The entire disclosures of the above applications are incorporated herein by reference.

BACKGROUND

This section provides background information related to the present disclosure which is not necessarily prior art.

TECHNICAL FIELD

The present invention relates to a method of billing an online purchase of a user. More specifically, the invention relates to a method of billing an online purchase of a user by himself or by a third party.

DISCUSSION

The purchase of goods over the internet is getting more and more popular. Herein the sale and the purchase of goods over the internet offers advantages both for the vendor and for the purchaser. The vendor approaches a considerable larger group of purchasers over the medium internet than he could approach by a single shop. Basically the vendor by selling over internet is able to establish a worldwide representation with a single distribution center and thus to approach a worldwide group of purchasers. The purchaser is offered the advantage that he can access to a highly extensive array of products independent of his residence or location. Moreover he is able to compare the assortments of different vendors directly with each other in a simple way without being dependent on actually visiting the vendors in their shops. In the following this kind of purchase over the internet is called online purchase and the assortment of the vendors is called internet shop.

In the meantime a large number of vendors of different goods have been established in the internet. Herein the greatest part of these vendors is specialized in a special assortment of goods. Thus, for example, a first online vendor offers solely products in the field of consumer electronics, a second online purchaser offers only clothing and a third online purchaser offers toys.

If a user now wants to purchase a number of different products he of course has to visit the internet shop of each vendor at which the user wants to purchase goods. In order to complete the purchase the user has to identify himself/herself anew at each vendor or in each internet shop at which he/she wants to purchase goods at least by specifying his/her banking connection and method of payment as well as the delivery address. Often the user has to provide further information and to set up a user profile in the internet shop of the vendor. Particularly if the purchaser just once wants to purchase goods in a certain internet shop providing this information is often perceived as annoying and uncomfortable.

In contrast a purchaser by visiting a real department store is able to purchase different goods in different departments of the department store and to pay these goods altogether at a cash point such as a general pay desk.

Recently even in the internet online department stores have been established which offer a greater assortment of goods. However, these vendors normally are not specialized to the respective offered goods in a way as internet shops are which offer only a limited specialized assortment of goods.

In a case where goods are not purchased for the personal usage but, for example, as a present for a third party it often happens that the third party who ought to be presented communicates concrete wishes in terms of the goods—i.e. presents. Here, too, the purchase of goods over the internet offers advantages because normally the search for the desired goods by means of search engines is very simple. However, the third party to be presented herein has to keep track of with respect to which person he/she has communicated wishes in order to avoid a multiple presentation with the same good.

SUMMARY OF THE INVENTION

In view of the above it is an object of the present invention to provide a method by which goods of different online providers can be purchased by a common purchasing process. In another aspect it is an object of the invention to provide a method which enables to accumulate goods of different online providers in a common shopping cart and to purchase them by different purchasers.

This object is achieved by a method according to the teachings of the present disclosure. Embodiments of the method arise from the following description.

Thus there is proposed a method of billing an online purchase of a user, comprising:
  detecting an article selected by a user for purchase at a first online provider;
  at least temporarily storing an article data set associated to the article in a transmission data set associated to the online provider:
  detecting a check-out message of the user by means of which the user indicates the completion of his purchase at the online provider;
  detecting an identification input of the user for identification at a billing center; transmitting the transmission data set associated to the online provider to a billing center different from the online provider;
  detecting an article selected for purchase at another online provider;
  at least temporarily storing an article data set associated to the article in a transmission data set associated to the online provider:
  detecting a check-out message of the user by means of which the user indicates the completion of his purchase at the online provider;
  transmitting the transmission data set associated to the online provider to a billing center different from the online provider;
  detecting a check-out message of the user by means of which the user indicates the completion of his purchase as a whole;
  billing the online purchases with respect to the user or a third party by the billing center based on the transmitted transmission data sets; and billing the online purchases with respect to the online providers based on the transmitted transmission data sets.

The method according to the invention enables a user in a simple way to select articles from a plurality of internet shops, such as of providers specialized in groups of products, and to accumulate them in a common shopping cart which is independent of the internet shops. To this end the user has only to identify himself once in the course of the complete purchase. A separate identification with respect to the respective internet shops is no longer required. Thus, the user is able to implement his purchase in the internet in a way that is comparable to a shopping center or a department store with a centralized general pay desk.

The term "online provider" in the sense of the invention means the operator of an internet shop. An article data set according to the invention can include information about the article that an online provider offers in his internet shop. This information for example can include an article description, information about article attributes (such as colour and size), an article number, a retail price, information about a VAT rate or a comparable tax rate and/or the number of items the user wants to purchase. A transmission data set besides the article informations stated above can for example additionally include information about the online provider and his internet shop, respectively, as well as about the delivery methods (such as express delivery, etc.) offered by him. Herein these informations can also be transmitted in the form of an alphanumeric internet shop identification previously determined between the billing center and the online provider. A check-out message in the sense of the invention for example can be provided by operating a check-out button at the side of the user. Thus the term "detecting a check-out message" in the sense of the invention also means the operation of a check-out button by the user. To this end it can be provided that a corresponding check-out button is provided to the user in a user interface.

According to one embodiment of the invention it can be provided that the display of the superordinate shopping cart is implemented for example in the form of a bookmarklet which at any time can be displayed via the respective contents of the internet shop without having to exit. Herein the display, for example, is implemented in an overlapping way on the highest level and can be closed at any time.

In one embodiment of the method according to the invention it can be provided that the user registers himself once by specifying the identification input at the billing center with the specification of his personal data, a credit card account and/or a bonus system user account and the billing of the online purchases with respect to the user is implemented by the billing center by debiting an amount of an official means of payment from the credit card account of the user and/or by debiting an amount of a bonus means of payment from the bonus system user account of the user, wherein the credit card account is associated to a credit card entity and the bonus system user account is associated to a bonus system entity. Herein the term "credit card entity" means a credit card provider or a bank. Moreover the term "credit card account" according to the invention also stands for a bank account such as a giro account, from which the user can allow debits of amounts of an official means of payment. The term "bonus system entity" according to the invention denotes the operator or provider of a bonus system, such as a customer loyalty system, or a payment on the base of a virtual means of payment. Herein, for example, the user is awarded with bonus points for the purchase of goods at providers who have joined to the bonus system which the user can accumulate on a user account within the bonus system or bonus points are offered to the user which he can purchase by exchange with an official means of payment. The accumulated bonus points then can be redeemed at the providers participating in the bonus system.

According to the invention it can be particularly provided that the user for processing a purchase pays both by using an official means of payment, i.e. an official currency, and by use of bonus means of payments, such as bonus points which within the bonus system represent a value of an official means of payment. Thus the user is provided the opportunity of a mixed method of payment. Herein it comes also into consideration that the user implements payments by use of bonus credits of different bonus systems.

In a further embodiment of the method according to the invention it can be provided that in billing the online purchases with respect to the user by the billing center by debiting an amount of an official means of payment from a credit card account of the user a means of payment data set is transmitted from the billing center to the credit card entity and the credit card entity credits a corresponding amount of the official means of payment to a clearing account of the online provider or the billing center on the base of the means of payment data set and wherein in billing the online purchases with respect to the user by the billing center by debiting an amount of a bonus means of payment from a bonus system user account of the user a bonus means of payment data set is transmitted from the billing center to the bonus system entity and the bonus system entity credits an amount of an official means of payment corresponding to the billed amount of the bonus means of payment to a clearing account of the online provider or the billing center on the base of the transmitted bonus means of payment data set.

In a further embodiment of the method according to the invention it can be provided that the billing center after the transmission of the means of payment data set to the credit card entity and/or after the transmission of the bonus means of payment data set to the bonus system entity receives a feedback from the credit card entity and/or the bonus system entity indicating whether the credit card account has a sufficient credit line and/or the bonus system account of the user has a sufficient credit for billing the online purchase. In this way it can be ensured that the user actually has a sufficient creditworthiness and a sufficient credit/bonus credit, respectively, for implementing the purchase such that the risk of non-payment at the side of the online provider can be reduced.

In a further embodiment of the method according to the invention it is provided that after a first detection of a check-out message within an online purchase by the billing center the articles purchased within the online purchase are indicated to the user in a user interface on the base of the transmitted article data set. This enables the user in a comfortable way to get an overview of the goods put into the common shopping cart up to this point in the course of the purchase made. This for example can be implemented in the form of the bookmarklet described above.

Further it can be provided that the actual credit line of the credit card account and/or the actual credit of the bonus system user account is indicated to the user in the user interface. This enables the user to get an actual overview over the expense which occurred up to this point during the course of his purchase.

In a preferred embodiment of the method according to the invention it can further be provided that the user after the transmission of the check-out message determines with respect to the billing center which partial amount of the billing of the online purchase should be charged from the credit card account and/or which partial amount of the online purchase should be charged from the bonus system user account. Thus the user is enabled in a comfortable way to determine a mixed payment, i.e. a payment of his purchase with different means of payment, and thus to use the bonus points obtained within a bonus system according to desire.

In a further embodiment of the method according to the invention it can be provided that after a first detection of a check-out message of the user by the billing center a session identification is generated which is maintained during the complete online purchase and which is transmitted to the online provider(s), wherein the transmission data set transmitted from the online provider to the billing center includes the session identification.

Further it can be provided that at least the transmission data set between the online provider and the billing center and/or the means of payment data set and/or the bonus means of payment data set is transmitted between the billing center and the credit card entity and the bonus system entity, respectively, by use of an encryption algorithm. Thus the data safety during the implementation of the purchase can be increased and the risk of an abusing use of the data of a user and/or an online provider can be reduced. According to the invention to this end, for example, known encryption techniques such as Cipher Block Chaining (CBC), Cipher Feedback Mode (CFB), Output Feedback (OFB) or Counter Mode (CTR) can be used.

In a preferred embodiment of the method according to the invention it can be provided that the user by means of a user terminal which is connected to a server of the first online provider over a packet-switched network makes a selection with respect to the article to be purchased at the first online provider. After selecting the article the user can initiate the check-out process at the user terminal and generate a check-out message which is transmitted to a server of the billing center over the packet-switched network. The server of the billing center generates a session identification which is transmitted to the server of the first online provider and the server of the first online provider generates an article data set with respect to the article selected by the user and transmits this data set together with the session identification as a transmission data set to the server of the billing center. The server of the billing center initiates under transmission of the session identification the generation of a user interface on the user terminal which at least comprises a check-out button for initiating a check-out message to the server of the billing center. The user subsequently by means of the user terminal which is connected to a server of a second online provider by the packet-switched network makes a selection with respect to the article to be purchased at the second online provider. After the selection of the article the user can generate the check-out message at the user terminal which is transmitted to a server of the billing center over the packet-switched network. The server of the billing center transmits the generated session identification to the server of the second online provider and the server of the second online provider generates an article data set with respect to the article selected by the user and transmits this data set together with the session identification as a transmission data set to the server of the billing center. The user operates the check-out button of the user interface generated on the user terminal in order to terminate the online purchase whereby the check-out message is transmitted from the user terminal to the server of the billing center. Subsequently the server of the billing center transmits the means of payment data set and/or the bonus means of payment data set over the packet-switched network to a server of the credit card entity and a server of the bonus system entity, respectively, and the server of the credit card entity and the server of the bonus system entity, respectively, initiates on the base of the transmitted means of payment data set and/or the bonus means of payment data set the credit entry of an amount of the official means of payment which represents the price of the purchased article in a clearing account.

For a further increase of the safety during the communication between the participating servers or terminals according to one embodiment of the method it can be provided that the server of the online provider generates an article data set with respect to the article selected by the user and transfers this data set as a transmission data set to the server of the billing center. The server of the online provider parallel generates a hash value from the transmission data set and an identification which is known exclusively to the online provider and the billing center (for example a password). The transmission data set is transmitted together with this hash value to the server of the billing center over a packet-switched network. The server of the billing center is capable to check the validity of the sender on the base of the transmitted hash value.

Such hash value or hash key may consist of clear text information of the article, like e.g. labeling, order number, color, size, price etc., and secret part exclusively know by the online shop provider and the billing center. To further protect the information on the article to be transmitted from the online shop provider to the billing center from unauthorized manipulation the online shop provider may submit in a first step an url (uniform resource locator) of the shop side presenting the article chosen. In a second step the billing center jumps back to the url transmitted by the online shop provider and reads a proprietary tag comprising the clear text information on e.g. order number, labeling, shop provider identification, price, and currency. The proprietary tag also comprises the hash value (hash key) which is constructed as described above. After reading of these information the billing center entity calculates a comparison hash value or hash key on its side based on the clear text information read and compares the hash value or hash key gathered by the proprietary tag and the calculated hash value or hash key. If both keys do not agree to each other, some information transmitted may be manipulated or compromised by a third party in an unauthorized way. Only if the two hash value or hash keys agree to each other, the article will be added to the virtual superordinated shopping cart.

To establish this kind of communication to the billing center, the online shop provider may install an application, like e.g. a JAVA-applet, on the homepage. When the user decides to make us of the virtual superordinated shopping cart, an appropriate user interface may be activated on the client. Such user interface may be an Inlineframe (Iframe) which will pop up on the online shop provider's homepage, more specifically on the homepage of the item selected by the user for purchase. This renders the virtual superordinated shopping cart independent from the online shop provider's homepage.

According to a further embodiment it can be provided that the server of the billing center comprises a data base in which information with respect to the credit card account and/or the bonus system user account of the user is stored together with a unique identification input for associating the respective means of payment data set and/or bonus means of payment data set to the credit card account and/or the bonus system user account of the user. The data base further can include information about purchases previously made on the user side. These data can be processed on the side of the billing center and/or a service provider such that information with respect to articles in which the user previously has been interested together with the session identification is transmitted to the online providers and the online provider can specifically offer to the user further articles in which the user is possibly interested for purchase on the base of these informations.

Moreover it can be provided that the server of the billing center after reception of the check-out message initiates an inquiry to the server of the credit card entity and/or to the server of the bonus system entity in response to which the server of the billing center receives an acknowledgment from the server of the credit card entity and/or the server of the bonus system entity indicating the actual credit line on the credit card account and the credit on the bonus system user account, respectively, of the user and the server transmits this information to the user terminal for display on the user terminal. Thus the user at any time during the purchase is aware of his credit still available and if the purchase price of articles to be purchased is covered by the credit or not.

Further according to the invention it can be provided that the data base includes information about a standard delivery address of the user to which the purchased article is to be delivered and the server of the billing center transmits the standard delivery address to the server of the online provider. Thus the comfort for the user is further increased.

With respect to the aspect of the invention relating a method which enables a user to accumulate goods of different online providers in a common shopping cart and to purchase them by different purchasers, the process may be different. In the process, a number of steps are inserted by which a third party is enabled to select items they want to purchase for the originally first user. These steps are:
  providing an overview of the articles selected by the user at the online providers for at least one further user by the billing center:
  detecting an identification input of the at least one further user for identification at a billing center;
  detecting a selection of an article of the at least one further user from the overview and associating the selection of the at least one further user to the transmission data set of the article selected by the user from the overview;
  detecting a check-out message of the at least one further user;
  deleting the article detected with the selection of the at least one further user from the overview; and
  billing the articles detected with the selection with respect to the at least one further user by the billing center based on the transmitted transmission data set.

Said steps are inserted into the process according to the invention prior to the last step of "billing the online purchases with respect to the online providers based on the transmitted transmission data sets", and wherein the third party mentioned in the step of "billing the online purchases with respect to the user or a third party by the billing center based on the transmitted transmission data sets" is the at least one further user.

For the billing by a third party (further user) the overall process according to the invention is as follows:

A method of billing an online purchase of a user, comprising:
  detecting an article selected by a user for purchase at a first online provider;
  at least temporarily storing an article data set associated to the article in a transmission data set associated to the online provider:
  detecting a check-out message of the user by which the user indicates the completion of his purchase at the online provider;
  detecting an identification input of the user for identification at a billing center;
  transmitting the transmission data set associated to the online provider to a billing center different from the online provider;
  detecting an article selected for purchase by the user at another online provider;
  at least temporarily storing an article data set associated to the article in a transmission data set associated to the online provider:
  detecting a check-out message of the user by which the user indicates the completion of his purchase at the online provider;
  transmitting the transmission data set associated to the online provider to the billing center different from the online provider;
  detecting a check-out message of the user by which the user indicates the completion of his purchase as a whole;
  providing an overview of the articles selected by the user at the online providers for at least one further user by the billing center:
  detecting an identification input of the at least one further user for identification at a billing center;
  detecting a selection of an article of the at least one further user from the overview and associating the selection of the at least one further user to the transmission data set of the article selected by the user from the overview;
  detecting a check-out message of the at least one further user; deleting the article detected with the selection of the at least one further user from the overview;
  billing the articles detected with the selection with respect to the at least one further user by the billing center based on the transmitted transmission data set; and
  billing the online purchases with respect to the online providers based on the transmitted transmission data sets.

In the following the process of the invention will be explained with respect to a purchase by a third party of an item selected by a used in an online shop.

In the following the terms "further user" and "third party" are used interchangeably. The method according to the invention enables a user in a simple way to select articles from a plurality of internet shops, such as of providers specialized in groups of products, to accumulate them in a common shopping cart which is independent of the internet shops and enables a third party to purchase the articles placed in the shopping card for the user. This, for example, enables a user to compose a shopping cart across shops in the form of a wish list from which subsequently third parties, such as persons who want to present the user, can select articles and purchase them directly at the respective online shop. To this end the user who prepares the shopping cart has only to identify himself once in the course of the complete purchase. A separate identification with respect to the respective internet shops is no longer required. Thus, the user is able to implement his purchase in the internet in a way that is comparable to a shopping center or a department store with a centralized general pay desk. By making available the shopping cart for third parties a kind of table of presents is created from which third parties can select an appropriate present which they want to offer the user. This ensures that the user gets exactly the presents he has selected. On the other hand it enables a third party in a simple and secure way to please the user with exactly that present which he has selected without the need for the third party to search for an appropriate present.

The term "online provider" in the sense of the invention means the operator of an internet shop. An article data set according to the invention can include information about the article that an online provider offers in his internet shop. This information for example can include an article description, information about article attributes (such as colour and size), an article number, a retail price, information about a VAT rate or a comparable tax rate and/or the number of items the user wants to purchase. A transmission data set besides the article informations stated above can for example additionally include information about the online provider and his internet shop, respectively, as well as about the delivery methods (such as express delivery, etc.) offered by him. Herein these informations can also be transmitted in the form of an alphanumeric internet shop identification previously determined between the billing center and the online provider. A check-out message in the sense of the invention for example can be provided by operating a check-out button at the side of the user. Thus the term "detecting a check-out message" in the sense of the invention also means the operation of a check-out button by the user. To this end it can be provided that a corresponding check-out button is provided to the user in a user interface.

According to one embodiment of the invention it can be provided that the display of the superordinate shopping cart is implemented for example in the form of a bookmarklet which at any time can be displayed via the respective contents of the internet shop without having to exit it. Herein the display, for example, is implemented in an overlapping way on the highest level and can be closed at any time.

In an equivalent way it is possible to make the shopping cart composed by the user available for the third party who wants to access to the shopping cart.

In order to get access to the shopping cart composed by the user (herein also called "overview") the overview is made available to the third party preferably by use of a unique identification. Herein the unique identification, for example, can consist of an alphanumeric designation or can be characterized uniquely by associating the overview with the user or a user identification.

Thus in one embodiment of the invention it can be provided that the user makes the overview created by him accessible for third parties over a valid social media profile, such as facebook, Xing, Studi-VZ and the like.

In one embodiment of the method according to the invention it can be provided that the user registers himself at the billing center by once specifying the identification input and with the input of his personal data.

According to a further embodiment of the method according to the invention it can be provided that the third party who wants to present the user from the shopping cart composed as an overview registers himself, too, as a user by once specifying an identification input, personal data as well as a credit card account and/or a bonus system user account and the billing of the online purchases with respect to the third party is performed by the billing center by debiting an amount of an official means of payment from the credit card account of the third party and/or by debiting an amount of a bonus means of payment from the bonus system user account of the third party, wherein the credit card account is associated to a credit card entity and the bonus system user account is associated to a bonus system entity. Herein the term "credit card entity" means a credit card provider or a bank. Moreover the term "credit card account" according to the invention also stands for a bank account such as a giro account, from which the third party as user can allow debits of amounts of an official means of payment. The term "bonus system entity" according to the invention denotes the operator or provider of a bonus system, such as a customer loyalty system, or a payment on the base of a virtual means of payment. Herein, for example, the third party as user is awarded with bonus points for the purchase of goods at providers who have joined the bonus system which he can accumulate on a user account within the bonus system or bonus points are offered to the user which he can purchase by exchange with an official means of payment. The accumulated bonus points then can be redeemed at the providers participating in the bonus system.

According to a further embodiment of the invention it can be provided that the billing center as an identification input of the user and/or third party makes reference to an already existing identification input of the user and/or third party in other systems, such as social-media networks. Thus, it can be provided that the user/third party registers himself by use of a profile valid for him in Facebook, Xing, Studi-VZ or the like, possibly by adding necessary specifications for the billing of the online purchases, such as account data.

According to the invention it can be particularly provided that the third party for processing a purchase pays both by using an official means of payment, i.e. an official currency, and by use of bonus means of payments, such as bonus points which within the bonus system represent a value of an official means of payment. Thus the third party is provided the opportunity of a mixed method of payment. Herein it comes also into consideration that the third party implements payments by use of bonus credits of different bonus systems.

In a further embodiment of the method according to the invention it can be provided that in billing the online purchases with respect to the third party by the billing center by debiting an amount of an official means of payment from a credit card account of the third party a means of payment data set is transmitted from the billing center to the credit card entity and the credit card entity credits a corresponding amount of the official means of payment to a clearing account of the online provider or the billing center on the base of the means of payment data set and wherein in billing the online purchases with respect to the third party by the billing center by debiting an amount of a bonus means of payment from a bonus system user account of the third party a bonus means of payment data set is transmitted from the billing center to the bonus system entity and the bonus system entity credits an amount of an official means of payment corresponding to the billed amount of the bonus means of payment to a clearing account of the online provider or the billing center on the base of the transmitted bonus means of payment data set.

In a further embodiment of the method according to the invention it can be provided that the billing center after the transmission of the means of payment data set to the credit card entity and/or after the transmission of the bonus means of payment data set to the bonus system entity receives a feedback from the credit card entity and/or the bonus system entity indicating whether the credit card account has a sufficient credit line and/or the bonus system account of the further user (third party) has a sufficient credit for billing the online purchase. In this way it can be ensured that the third party as a further user who wants to purchase an article from the overview actually has a sufficient creditworthiness and a sufficient credit/bonus credit, respectively, for implementing the purchase such that the risk of non-payment at the side of the online provider can be reduced.

In a further embodiment of the method according to the invention it is provided that after a first detection of a check-out message within an online purchase by the billing center the articles purchased up to this point within the online purchase are indicated to the user in a user interface on the base of the transmitted article data set. This enables the user in a comfortable way to get an overview of the goods put into the common shopping cart up to this point in the course of the purchase made. This for example can be implemented in the form of the bookmarklet described above. According to an embodiment of the method according to the present invention the user interface herein comprises a marking means by which the user can select and mark articles within the shopping cart which he wants to make available to third parties as further users.

In a user interface used by the further user by means of which the further user is able to access to the overview of the desired articles created by the user it can be provided that the actual credit line of the credit card account and/or the actual credit on the bonus system user account is indicated to the further user.

In a preferred embodiment of the method according to the invention it can further be provided that the further user after the transmission of the check-out message determines with respect to the billing center which partial amount of the billing of the online purchase should be charged from the credit card account and/or which partial amount of the online purchase should be charged from the bonus system user account. Thus the further user is enabled in a comfortable way to determine a mixed payment, i.e. a payment of his purchase with different means of payment, and thus to use the bonus points obtained within a bonus system according to desire.

In a further embodiment of the method according to the invention it can be provided that after a first detection of a check-out message of the user, i.e. the person who created the shopping cart or the overview of the articles, by the billing center a session identification is generated which is maintained during the complete online purchase and which is transmitted to the online provider(s), wherein the transmission data set transmitted from the online provider to the billing center includes the session identification.

Herein in a further embodiment it can be provided that the generated session identification is associated with a unique identification under which the user makes available the overview to the further user. This enables in an advantageous way the correlation of payments made for the purchase of the goods by the user.

Further it can be provided that at least the transmission data set between the online provider and the billing center and/or the means of payment data set and/or the bonus means of payment data set is transmitted between the billing center and the credit card entity and the bonus system entity, respectively, by use of an encryption algorithm. Thus the data safety during the implementation of the purchase can be increased and the risk of an abusing use of the data of a user and/or an online provider can be reduced. According to the invention to this end, for example, known encryption techniques such as Cipher Block Chaining (CBC), Cipher Feedback Mode (CFB), Output Feedback (OFB) or Counter Mode (CTR) can be used.

In a preferred embodiment of the method according to the invention it can be provided that the user by means of a user terminal which is connected to a server of the first online provider over a packet-switched network makes a selection with respect to the article to be purchased at the first online provider. After selecting the article the user can generate a check-out message which is transmitted to a server of the billing center over the packet-switched network. The server of the billing center generates a session identification which is transmitted to the server of the first online provider and the server of the first online provider generates an article data set with respect to the article selected by the user and transmits this data set together with the session identification as a transmission data set to the server of the billing center. The server of the billing center initiates under transmission of the session identification the generation of a user interface on the user terminal which at least comprises a check-out button for initiating a check-out message to the server of the billing center. The user subsequently by means of the user terminal which is connected to a server of a second online provider by the packet-switched network makes a selection with respect to the article to be purchased at the second online provider. After the selection of the article the user can generate the check-out message at the user terminal which is transmitted to a server of the billing center over the packet-switched network. The server of the billing center transmits the generated session identification to the server of the second online provider and the server of the second online provider generates an article data set with respect to the article selected by the user and transmits this data set together with the session identification as a transmission data set to the server of the billing center. A user interface which is displayed for the user comprises means for selecting articles associated to the transmission data sets transmitted to the billing center by means of which these articles are marked as articles to be incorporated in an overview to be provided for at least one further user. The server at the billing center associates the overview with a unique overview identification. The at least one further user accesses to the overview by means of a user terminal which is connected to a server of the billing center through a packet-switched network by specifying the overview identification by means of a user interface. The further user selects at least one article for purchase from the overview. The further user operates the check-out button of the user interface generated on the user terminal in order to terminate the online purchase whereby the check-out message is transmitted from the user terminal to the server of the billing center. Subsequently the server of the billing center transmits the means of payment data set and/or the bonus means of payment data set over the packet-switched network to a server of the credit card entity and a server of the bonus system entity, respectively, and the server of the credit card entity and the server of the bonus system entity, respectively, initiates on the base of the transmitted means of payment data set and/or the bonus means of payment data set the credit entry of an amount of the official means of payment which represents the price of the purchased article on a clearing account.

For a further improvement of the safety during the communication between the participating servers or terminals according to one embodiment of the method it can be provided that the server of the online provider generates an article data set with respect to the article selected by the user and transfers this data set as a transmission data set to the server of the billing center. The server of the online provider parallel generates a hash value from the transmission data set and an identification which is known exclusively to the online provider and the billing center (for example a password). The transmission data set is transmitted together with this hash value to the server of the billing center over a packet-switched network. The server of the billing center is capable to check the validity of the sender on the base of the transmitted hash value.

In a comparable way in one embodiment of the method in order to further improve the safety during the communication between the participating servers or terminals it can be provided that the server of the billing center transmits the transmission data set to the server of the online provider with respect to the article selected by the further user. The server of the billing center parallel generates a hash value from the transmission data set and an identification which is exclusively known to the online provider and the billing center (for example a password). The transmission data set is transmitted together with this hash value to the server of the online provider over a packet-switched network. The server of the online provider is capable to check the validity of the sender on the base of the transmitted hash value.

Such hash value or hash key may consist of clear text information of the article, like e.g. labeling, order number, color, size, price etc., and secret part exclusively know by the online shop provider and the billing center. To further protect the information on the article to be transmitted from the online shop provider to the billing center from unauthorized manipulation the online shop provider may submit in a first step an url (uniform resource locator) of the shop side presenting the article chosen. In a second step the billing center jumps back to the url transmitted by the online shop provider and reads a proprietary tag comprising the clear text information on e.g. order number, labeling, shop provider identification, price, and currency. The proprietary tag also comprises the hash value (hash key) which is constructed as described above. After reading of these information the billing center entity calculates a comparison hash value or hash key on its side based on the clear text information read and compares the hash value or hash key gathered by the proprietary tag and the calculated hash value or hash key. If both keys do not agree to each other, some information transmitted may be manipulated or compromised by a third party in an unauthorized way. Only if the two hash value or hash keys agree to each other, the article will be added to the virtual superordinated shopping cart.

To establish this kind of communication to the billing center, the online shop provider may install an application, like e.g. a JAVA-applet, on the homepage.

According to a further embodiment it can be provided that the server of the billing center comprises a data base in which information with respect to the credit card account and/or the bonus system user account of the further user is stored together with a unique identification input for associating the respective means of payment data set and/or bonus means of payment data set to the credit card account and/or the bonus system user account of the further user. The data base further can include information about purchases previously made on the user side. These data can be processed on the side of the billing center and/or a service provider such that information with respect to articles in which the user previously has been interested together with the session identification is transmitted to the online providers and the online provider can specifically offer to the user further articles in which the user is possibly interested for purchase on the base of these information.

Moreover it can be provided that the server of the billing center after reception of the check-out message of the further user initiates an inquiry to the server of the credit card entity and/or to the server of the bonus system entity in response to which the server of the billing center receives an acknowledgment from the server of the credit card entity and/or the server of the bonus system entity indicating the actual credit line on the credit card account and the credit on the bonus system user account, respectively, of the further user and the server transmits this information to the user terminal for display in the user interface. Thus at any time during the purchase the further user is aware of his credit still available and if the purchase price of articles to be purchased is covered by the credit or not.

Further according to the invention it can be provided that the data base includes information about a standard delivery address of the user to which the purchased article is to be delivered and the server of the billing center transmits the standard delivery address to the server of the online provider. Thus the comfort for the user and the further user is further increased. Moreover it can be provided that the user interface displayed for the further user provides means for inputting an address which is different from the standard delivery address of the user for whom the further user purchases an article from the overview. This enables the further user to initiate, that the article is not sent directly to the user or creator of the overview but, for example, to his own address if he wants to hand over the article personally to the user.

Moreover the invention relates to a computer program, which when implemented by a processor of a data processing device is configured to implement a method of billing an online purchase of an article by a user at an online provider according to any one of the methods described above as well as a computer program, which when implemented by a processor of a data processing device is configured to implement a method of billing an online purchase of an article by a third party (further user) which article was selected by a first user at an online provider according to any one of the methods described above.

BRIEF DESCRIPTION OF THE DRAWINGS

The drawings described herein are for illustrative purposes only of selected embodiments and not all possible implementations, and are not intended to limit the scope of the present disclosure.

In the following the invention is explained further on the base of exemplary embodiments and the figures.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
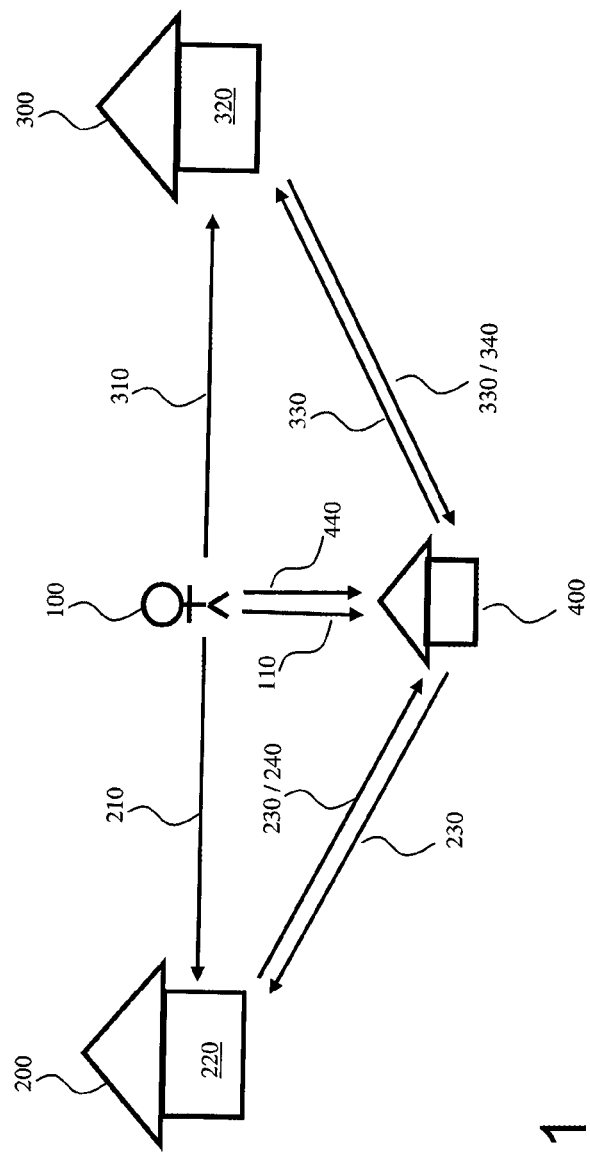
FIG. 1 shows schematically the process of a method according to the invention.

FIG. 1 shows schematically the process of a method of the invention. A user 100 selects an article 210 for purchase at a first online provider 200. This selection is stored at least temporarily as an article data set 220 in a transmission data set 230 associated to the online provider 200. After the selection is completed the user 100 operates a check-out button which generates a check-out message 240 indicating the completion of his purchase at the online provider 200. After the generation of the check-out message 240 the user 100 is prompted to input an identification input 110 for identification at a billing center 400. The transmission data set 230 associated to the online provider 200 is transmitted to a billing center 400 different from the online provider 200. Herein the transmission data set also includes the identification input 110 of the user 100. Now the user 100 can select an article 310 for purchase at another online provider 300. Here, too, an article data set 320 associated to the article 310 is at least temporarily stored within a transmission data set 330 associated to the online provider 300. Subsequently a check-out message 340 of the user 100 is detected by means of which the user 100 indicates the completion of his purchase at the online provider 300. The transmission data set 330 associated to the online provider 300 is transmitted to the billing center 400 different from the online provider 300. At the end of the purchase a check-out message 440 of the user 100 is detected by means of which the user indicates the completion of his purchase as a whole. Subsequently billing of the online purchases with respect to the user 100 by the billing center 400 on the base of the transmitted transmission data sets 230, 330 as well as billing of the online purchases with respect to the online providers 200, 300 also on the base of the transmitted transmission data sets 230, 330 are implemented.

Figure 2:
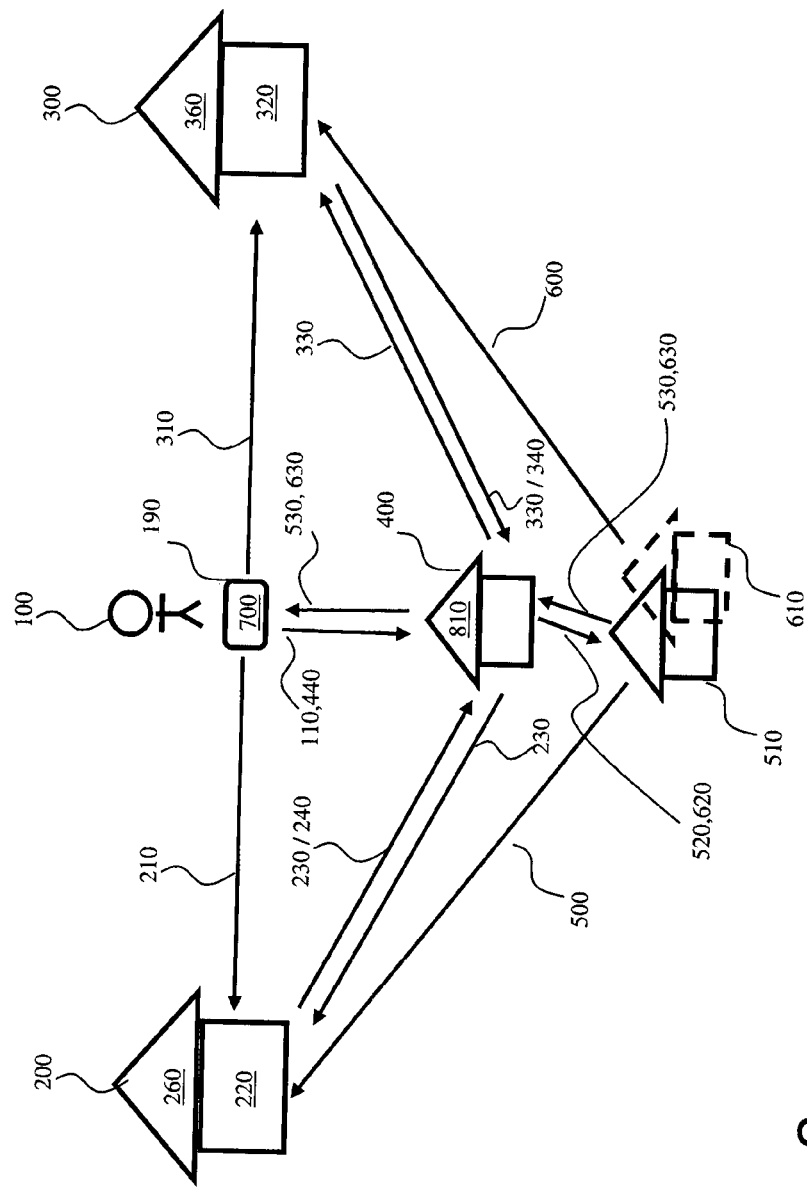
FIG. 2 shows schematically the process of a method according to the invention taking into account a payment process.

FIG. 2 shows schematically the process of a method according to the invention taking into account a payment process. The user 100 selects over a user terminal 190 an article 210 for purchase at a first online provider 200. This selection is at least temporarily stored as an article data set 220 within a transmission data set 230 associated to the online provider 200. After the completion of the selection the user 100 operates a check-out button which generates a check-out message 240 indicating the completion of his purchase at the first online provider 200. After the generation of the check-out message 240 the user 100 is prompted to input an identification input 110 for identification at an billing center 400. The transmission data set 230 associated to the online provider 200 is transmitted to a billing center 400 different from the online provider 200. Herein the transmission data set also includes the identification input 110 of the user 100. Now the user 100 can select an article 310 for purchase at another online provider 300. Here, too, an article data set 320 associated to the article 310 is at least temporarily stored within a transmission data set 330 associated to the online provider 300. Subsequently a check-out message 340 of the user 100 is detected by means of which the user 100 indicates the completion of his purchase at the online provider 300. The transmission data set 330 associated to the online provider 300 is transmitted to the billing center 400 different from the online provider 300. At the end of the purchase a check-out message 440 of the user 100 is detected by means of which the user 100 indicates the completion of his purchase as a whole. Subsequently billing of the online purchases with respect to the user 100 by the billing center 400 on the base of the transmitted transmission data sets 230, 330 as well as billing of the online purchases with respect to the online providers 200, 300 also on the base of the transmitted transmission data sets 230, 330 are implemented. To this end the user 100 registers himself once by determining the identification input 110 at the billing center 400 and the specifying a credit card account 150 and/or a bonus system user account 160. These data are then stored in a data base 810 for the actual and/or future use. Billing of the online purchases with respect to the user by the billing center 400 is implemented by charging the credit card account 150 of the user 100 with an amount of an official means of payment 500 and/or by charging the bonus system user account 160 of the user 100 with an amount of a bonus means of payment 600. Herein the credit card account 150 is associated to a credit card entity 510 and the bonus system user account 160 is associated to a bonus system entity 610. In billing the online purchases with respect to the user by the billing center 400 by charging the credit card account 150 of the user with an amount 500 of an official means of payment a means of payment data set 520 is transmitted from the billing center 400 to the credit card entity 510. The credit card entity 510 credits a corresponding amount of an official means of payment to a clearing account 260, 360, 460 of the online provider 200, 300 or the billing center 400 on the base of the transmitted means of payment data set 510. In an analogous way in billing the online purchases with respect to the user 100 by the billing center 400 by charging a bonus system user account 160 of the user 100 with an amount 600 of a bonus means of payment a bonus means of payment data set 620 is transmitted from the billing center 400 to the bonus system entity 610. The bonus system entity 610 credits an amount of an official means of payment which corresponds to the equivalent value of the billed amount of the bonus means of payment 600 to a clearing account 260, 360, 460 of the online provider 200, 300 or the billing center 400 on the base of the transmitted bonus means of payment data set 620. Moreover it can be provided that the billing center 400 after transmission of the means of payment data set 520 to the credit card entity 510 and/or after transmission of the bonus means of payment data set 620 to the bonus system entity 610 receives a feedback 530, 630 from the credit card entity 510 and/or the bonus system entity 610 indicating whether the credit card account 150 has a sufficient credit line and/or the bonus system account 160 of the user 100 has a sufficient credit for billing the online purchase. This feedback can also be indicated to the user 100 in the user interface 700 after a first detection of a check-out message 240 during the online purchase by the billing center 400 on the base of the transmitted article data set 220, 230. Thus the user permanently gets an overview over his expense. Moreover in the user interface 700 articles already purchased can be indicated.

Figure 3:
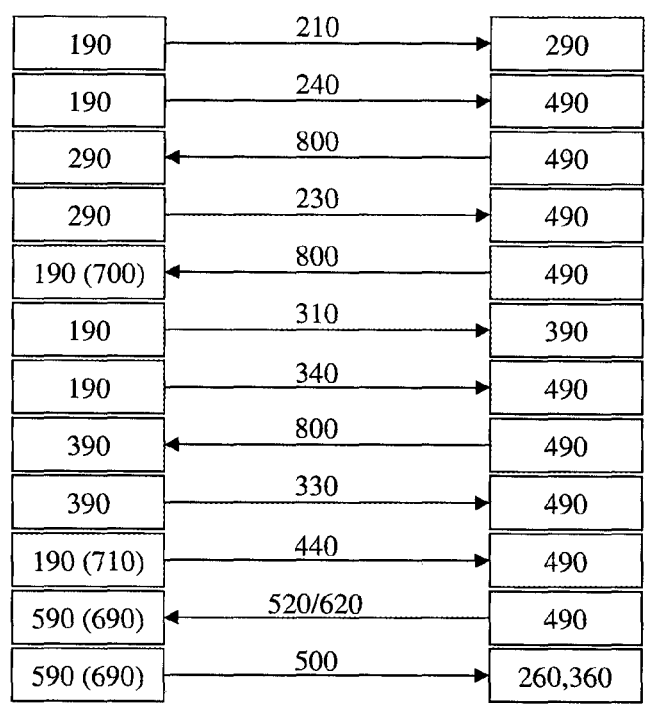
FIG. 3 shows the communication process between the servers participating in one exemplary embodiment of the method according to the invention.

FIG. 3 shows the communication process between the servers participating in one embodiment of the method according to the invention. The user makes a selection with respect to an article 200 to be purchased at the first online provider 210 by means of a user terminal 190 which is connected to a server 290 of the first online provider over a packet-switched network. After the selection of the article 210 the user generates at the user terminal 190 the check-out message 240 which is transmitted to a server 490 of the billing center over the packet-switched network. The server 490 of the billing center generates a session identification 800 which is transmitted to the server 290 of the first online provider. The server 290 of the first online provider generates an article data set with respect to the article 210 selected by the user and transmits it together with the session identification 800 as a transmission data set 230 to the server 490 of the billing center. The server 490 of the billing center 400 under transmission of the session identification 800 initiates the generation of a user interface 700 on the user terminal which at least comprises a check-out button 710 for initiating a check-out message 440 to the server 490 of the billing center. The user by means of the user terminal 190 which is also connected to a server 390 of the second online provider over the packet-switched network makes a selection with respect to the article to be purchased at the second online provider. After the selection of the article the user generates the check-out message 340 at the user terminal 190 which is transmitted to the server 490 of the billing center over the packet-switched network. The server 490 of the billing center transmits the generated session identification 800 to the server 390 of the second online provider. The server 390 of the second online provider generates an article data set with respect to the article selected by the user and transmits it together with the session identification 800 as a transmission data set 330 to the server 490 of the billing center. The user operates the check-out button 710 of the user interface 700 generated on the user terminal 190 in order to terminate the online purchase, whereby the check-out message 440 is transmitted from the user terminal 190 to the server 490 of the billing center. The server 490 of the billing center transmits the means of payment data set 520 and/or the bonus means of payment data set 620 to a server 590 of the credit card entity and a server 690 of the bonus system entity, respectively, over the packet-switched network. The server 590 of the credit card entity and the server 690 of the bonus system entity 610, respectively, initiate the credit entry of an amount of the official means of payment 500 representing the price of the purchased article in a clearing account 260, 360, 460 on the base of the transmitted means of payment data set 520 and/or the bonus means of payment data set 620.

Figure 4:
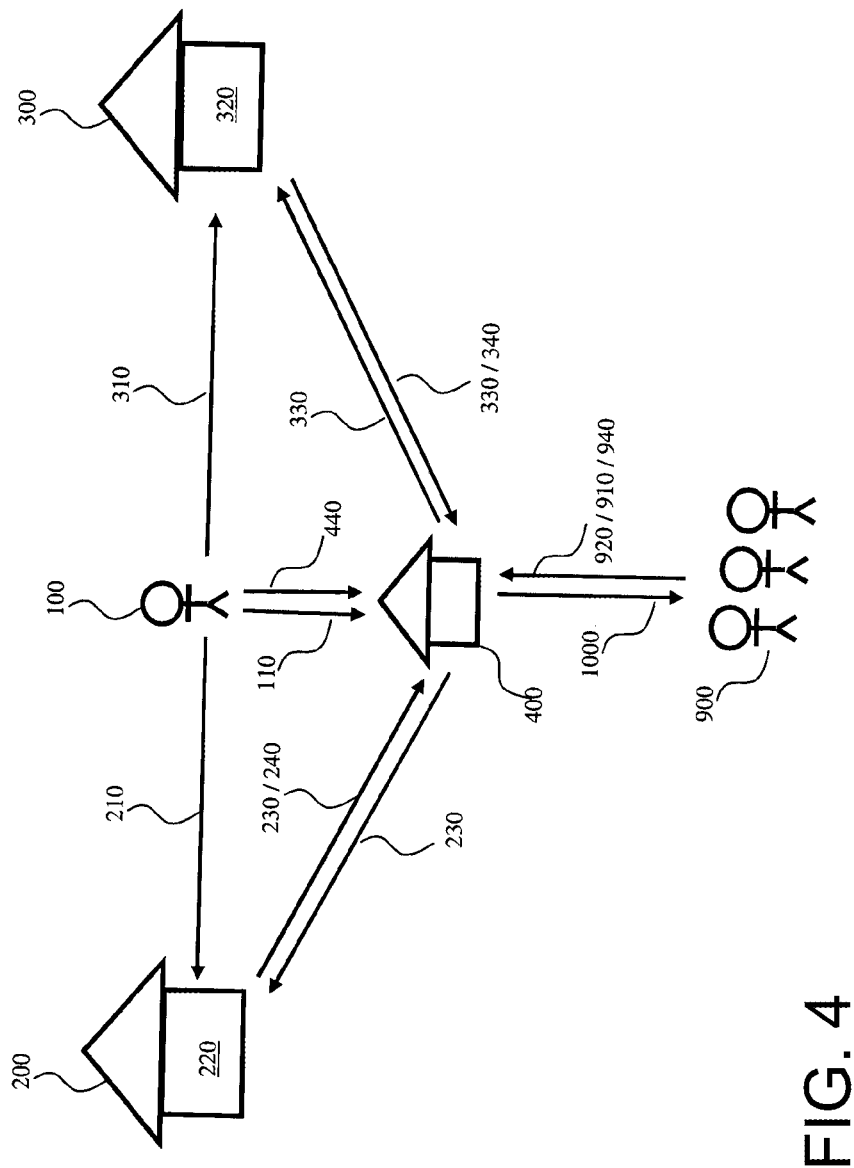
FIG. 4 shows schematically the process of a method according to the invention.

FIG. 4 shows schematically the process of a method of the invention. A user 100 selects an article 210 for purchase at a first online provider 200. This selection is stored at least temporarily as an article data set 220 in a transmission data set 230 associated to the online provider 200. After the selection is completed the user 100 operates a check-out button which generates a check-out message 240 indicating the completion of his purchase at the online provider 200. After the generation of the check-out message 240 the user 100 is prompted to input an identification input 110 for identification at a billing center 400. The transmission data set 230 associated to the online provider 200 is transmitted to a billing center 400 different from the online provider 200. Herein the transmission data set also includes the identification input 110 of the user 100. Now the user 100 can select an article 310 for purchase at another online provider 300. Here, too, an article data set 320 associated to the article 310 is at least temporarily stored within a transmission data set 330 associated to the online provider 300. Subsequently a check-out message 340 of the user 100 is detected by means of which the user 100 indicates the completion of his purchase at the online provider 300. The transmission data set 330 associated to the online provider 300 is transmitted to the billing center 400 different from the online provider 300. At the end of the purchase a check-out message 440 of the user 100 is detected by means of which the user indicates the completion of his purchase as a whole. The articles selected at the online providers 200/300 are made available to at least one further user 900 by the billing center 400 in the form of an overview 1000. The further user 900 identifies himself with respect to the billing center 400 by means of an identification input 920. Subsequently a selection 910 of an article 210/310 of the further user 900 from the overview 1000 is detected and the selection 910 is associated to the transmission data set 230/330 by the billing center 400. After the detection of a check-out message 940 of the further user 900 the article 210/310 detected with the selection 910 of the further user 900 is deleted from the overview 1000. Subsequently billing of the articles 210/310 detected with the selection 910 with respect to the further user 900 by the billing center 400 on the base of the transmitted transmission data sets 230, 330 as well as billing of the online purchases with respect to the online providers 200, 300 also on the base of the transmitted transmission data sets 230, 330 are implemented.

Figure 5:
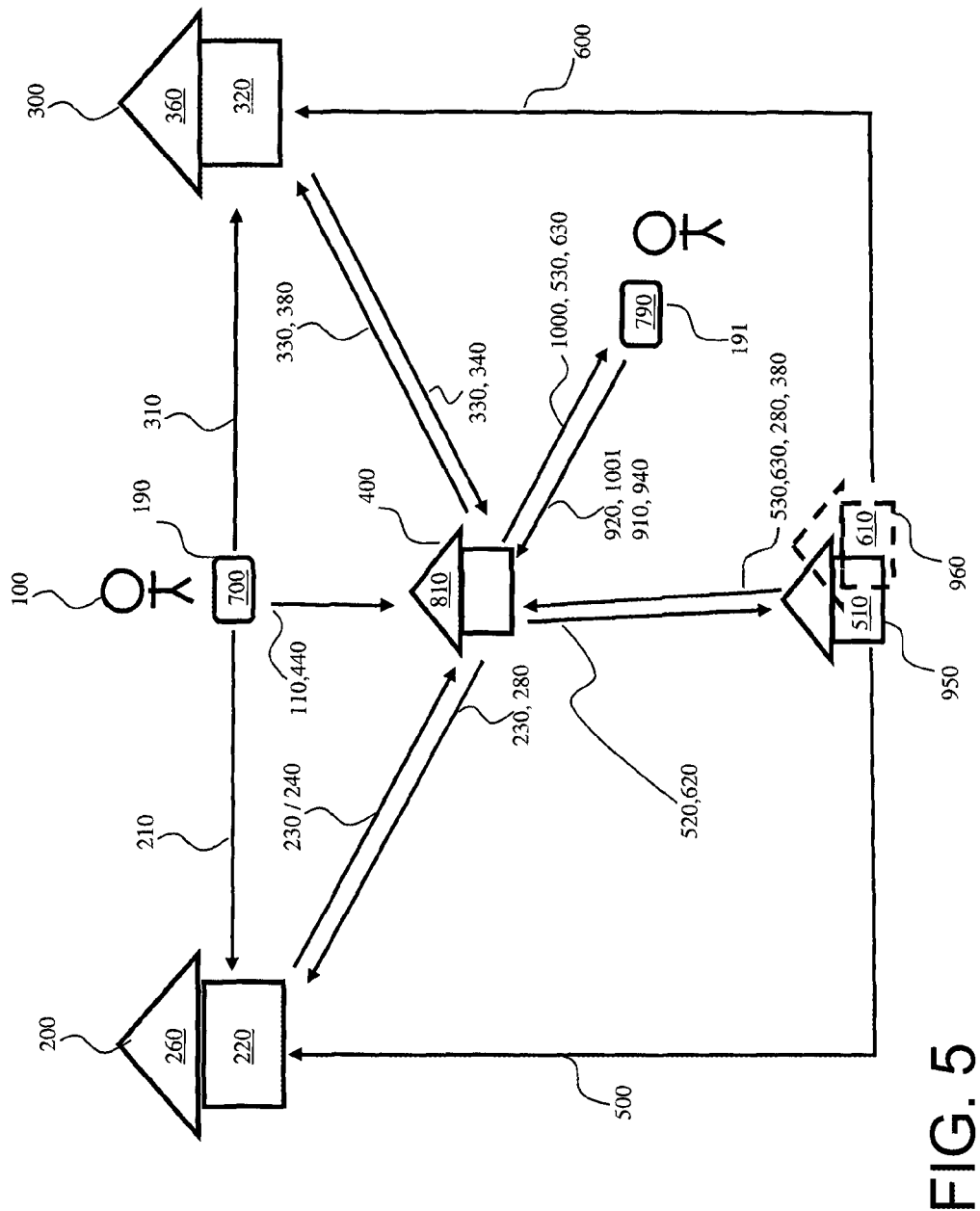
FIG. 5 shows schematically the process of a method according to the invention taking into account a payment process.

FIG. 5 shows schematically the process of a method according to the invention taking into account a payment process. A user 100 selects over a user terminal 190 an article 210 for purchase at a first online provider 200. This selection is at least temporarily stored as an article data set 220 within a transmission data set 230 associated to the online provider 200. After the completion of the selection the user 100 operates a check-out button which generates a check-out message 240 indicating the completion of his purchase at the online provider 200. After the generation of the check-out message 240 the user 100 is prompted to input an identification input 110 for identification at a billing center 400. The transmission data set 230 associated to the online provider 200 is transmitted to a billing center 400 different from the online provider 200. Herein the transmission data set 230 also includes the identification input 110 of the user 100. Now the user 100 can select an article 310 for purchase at another online provider 300. Here, too, an article data set 320 associated to the article 310 is at least temporarily stored within a transmission data set 330 associated to the online provider 300. Subsequently a check-out message 340 of the user 100 is detected by means of which the user 100 indicates the completion of his purchase at the online provider 300. The transmission data set 330 associated to the online provider 300 is transmitted to the billing center 400 different from the online provider 300. At the end of the purchase a check-out message 440 of the user 100 is detected by means of which the user 100 indicates the completion of his online purchase as a whole. The articles 210/310 selected by the user 100 at the online providers 200/300 are made available in an overview 1000 to at least one further user 900, wherein the overview 1000 is characterized by an overview identification 1001 and is identifiable. The further user 900 registers himself over a user terminal 191 at the billing center 400 by specifying an identification input 920 as well as the overview identification 1001. The further user 900 through a user interface 790 selects 910 an article 210/310 to be purchased by him for the user 100 from the articles 210/310 collected in the overview 1000. The further user 900 completes the purchase of his selection 910, wherein a check-out message 940 is transmitted to the billing center 400. Subsequently a billing of the online purchase with respect to the further user 900 by the billing center 400 is implemented on the base of the transmitted transmission data sets 230, 330 as well as the billing of the online purchases with respect to the online providers 230, 330 also on the base of the transmitted transmission data sets. To this end the further user 900 registers himself once by specifying the identification input 920 at the billing center 400 by specifying a credit card account 950 and/or a bonus system user account 960. These data are then stored in a data base 810 for the actual and/or future use. Billing of the online purchase with respect to the further user 900 by the billing center 400 is implemented by charging the credit card account 950 of the further user 900 with an amount of an official means of payment 500 and/or by charging the bonus system user account 960 of the further user 900 with an amount of a bonus means of payment 600. Herein the credit card account 950 is associated to a credit card entity 510 and the bonus system user account 960 is associated to a bonus system entity 610. In billing the online purchases with respect to the further user 900 by the billing center 400 by charging the credit card account 950 of the further user 900 with an amount 500 of an official means of payment a means of payment data set 520 is transmitted from the billing center 400 to the credit card entity 510. The credit card entity 510 credits a corresponding amount of an official means of payment to a clearing account 260, 360, 460 of the online provider 200, 300 or the billing center 400 on the base of the transmitted means of payment data set 510 and transmits a completion data set 280/380 to the server 290/390 of the online provider indicating the payment of the article 210/310, which the user 100 has selected, by the further user 900. In an analogous way in billing the online purchases with respect to the further user 900 by the billing center 400 by charging a bonus system user account 960 of the further user 900 with an amount 600 of a bonus means of payment a bonus means of payment data set 620 is transmitted from the billing center 400 to the bonus system entity 610. The bonus system entity 610 credits an amount of an official means of payment which corresponds to the equivalent value of the billed amount of the bonus means of payment 600 to a clearing account 260, 360, 460 of the online provider 200, 300 or the billing center 400 on the base of the transmitted bonus means of payment data set 620 and transmits a completion data set 280/380 to the server 290/390 of the online provider indicating the payment of the article 210/310, which the user 100 has selected, by the further user 900. Moreover it can be provided that the billing center 400 after transmission of the means of payment data set 520 to the credit card entity 510 and/or after transmission of the bonus means of payment data set 620 to the bonus system entity 610 receives a feedback 530, 630 from the credit card entity 510 and/or the bonus system entity 610 indicating whether the credit card account 950 has a sufficient credit line and/or the bonus system account 960 of the further user 900 has a sufficient credit for billing the online purchase. This feedback can also be indicated to the further user 900 in the user interface 790 after detection of the check-out message 240 during the online purchase by the billing center 400 on the base of the transmitted article data set 220, 230. Thus the further user 900 gets an overview over his expense.

Figure 6:
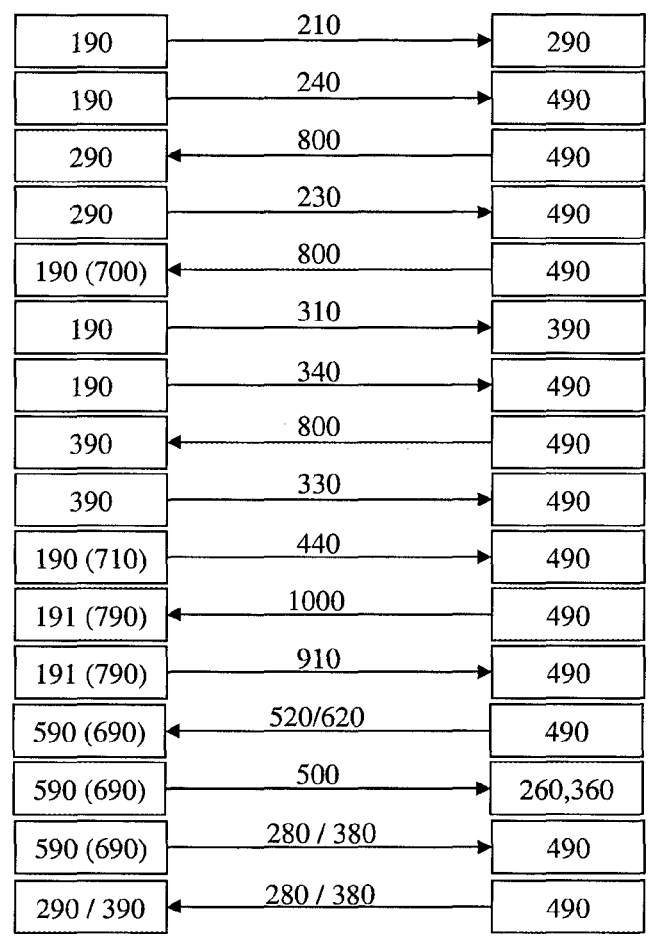
FIG. 6 shows the communication process between the servers participating in an exemplary embodiment of the method according to the invention.

FIG. 6 shows the communication process between the servers participating in one exemplary embodiment of the method according to the invention. The user makes a selection with respect to an article 200 to be purchased at the first online provider 210 by means of a user terminal 190 which is connected to a server 290 of the first online provider over a packet-switched network. After the selection of the article 210 the user generates at the user terminal 190 the check-out message 240 which is transmitted to a server 490 of the billing center over the packet-switched network. The server 490 of the billing center generates a session identification 800 which is transmitted to the server 290 of the first online provider. The server 290 of the first online provider generates an article data set with respect to the article 210 selected by the user and transmits it together with the session identification 800 as a transmission data set 230 to the server 490 of the billing center. The server 490 of the billing center 400 under transmission of the session identification 800 initiates the generation of a user interface 700 on the user terminal which at least comprises a check-out button 710 for initiating a check-out message 440 to the server 490 of the billing center. The user by means of the user terminal 190 which is also connected to a server 390 of the second online provider over the packet-switched network makes a selection with respect to the article to be purchased at the second online provider. After the selection of the article the user generates the check-out message 340 at the user terminal 190 which is transmitted to the server 490 of the billing center over the packet-switched network. The server 490 of the billing center transmits the generated session identification 800 to the server 390 of the second online provider. The server 390 of the second online provider generates an article data set with respect to the article selected by the user and transmits it together with the session identification 800 as a transmission data set 330 to the server 490 of the billing center. The user operates the check-out button 710 of the user interface 700 generated on the user terminal 190 in order to terminate the online purchase, whereby the check-out message 440 is transmitted from the user terminal 190 to the server 490 of the billing center. The articles selected by the user are made available by the server 490 to at least one further user in the form of an overview 1000. The further user makes a selection 910 of the articles to be purchased by him for the first user by means of a user interface 790 through a user terminal 191 which is connected to a server 490 over a packet-switched network. To this end the selection 910 of the further user is transmitted from the user terminal 191 to the server 490 of the billing center. The server 490 of the billing center transmits the means of payment data set 520 and/or the bonus means of payment data set 620 to a server 590 of the credit card entity and a server 690 of the bonus system entity, respectively, over the packet-switched network. The server 590 of the credit card entity and the server 690 of the bonus system entity 610, respectively, initiate the credit entry of an amount of the official means of payment 500 representing the price of the purchased article in a clearing account 260, 360, 460 on the base of the transmitted means of payment data set 520 and/or the bonus means of payment data set 620. The server 590 of the credit card entity and/or the server 690 of the bonus system entity transmits a completion data set 280/389 to the server 490 of the billing center which routes this completion data set 280/380 to the server 290 and 390, respectively, of the online provider whereby there are initiated corresponding shipping routines for shipping the articles.

Figure 7:
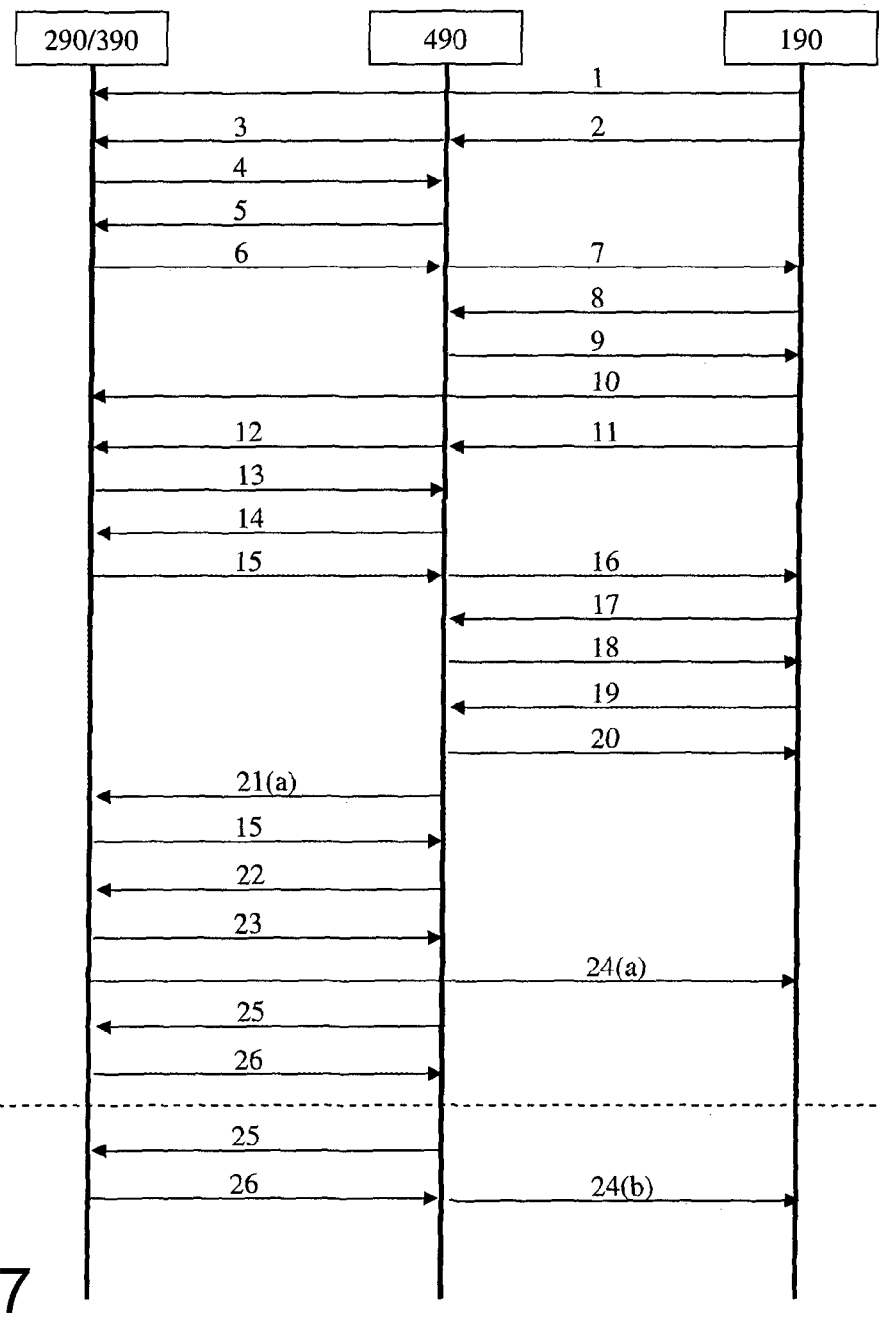
FIG. 7 shows a flowchart of the communication of the servers/clients in an exemplary embodiment of the method according to the invention.

FIG. 7 shows a flowchart of the communication of the servers/clients 190, 290, and 490 in an exemplary embodiment of the method according to the invention. In step 1 the user operates the online shop of the provider. To do so, the client 190 communicates with the online provider's server 290. To add an article to the superordinated shopping cart the user clicks a corresponding button in a user interface. By clicking this button, the client 190 communicates with the billing center server 490, as indicated in step 2. Within this communication, a jump-back url directing to the homepage of the selected article on server 290 is provided to server 490. In step 3 server 490 address the provided url server 290 and reads, as indicated in by step 4, the article data and the hash value (hash key) of the article selected by the user for purchase. By step 5 server 490 optionally sends a request on options, e.g. with respect to delivery or packaging, to server 290, which responds in step 6 by sending information on such options, if appropriate. These options are forwarded to client 190 by server 490 in step 7. Any option chosen by the user on client 190 is send to the server 490 in step 8, which responds in step 9 to client 190 by sending a summary of the chosen article and options back to the client 190. When purchasing another article from the same online shop (server 290) or another online shop (server 390), the steps 1 to 9 are performed once again, as indicated by steps 10 to 18. When the user has finished his purchases a communication is sent from client 190 to server 490, indication the end of the overall shopping procedure. In step 20, server 490 sends a confirmation/summary of the purchases to client 190. On a regular or unregular time basis server 290/390 contacts server 490 with a request about new purchases, as indicated in step 21a. Such request may be sent to server 490 e.g. as a xml information or a JAVA script object notation (JSON). In response, as indicated in step 22, server 490 provides data on new purchases for downloading by server 290/390. Each purchase operation is marked with a time stamp indication the time the purchase operation was finished in server 490. After finalizing the download indicated in step 22, server 290/390 sends an information back to server 490, indicating the time stamp of the last purchase operation which was downloaded, as indicated by step 23. Based on this information server 490 marks all purchase operations having a time stamp older or equal to the time stamp transmitted in step 23 as finalized. In step 24a an order confirmation is sent from server 290/390 to client 190. On a regular or unregular time basis, server 490 sends a request to server 290/390 for order confirmation on the purchases, as indicated by step 25, on which request server 490 will receive respectively information as indicated by step 26. Such transmitted information may also comprise information related to customer care issues, like e.g. preferred articles, preferred colors, etc. Optionally to step 24a, steps 25 and 26 may be performed prior to sending a confirmation/summary to the customer, as indicated by step 24b. In step 24b, server 490 sends a confirmation to the client 190, instead of server 290/390.

Figure 8:
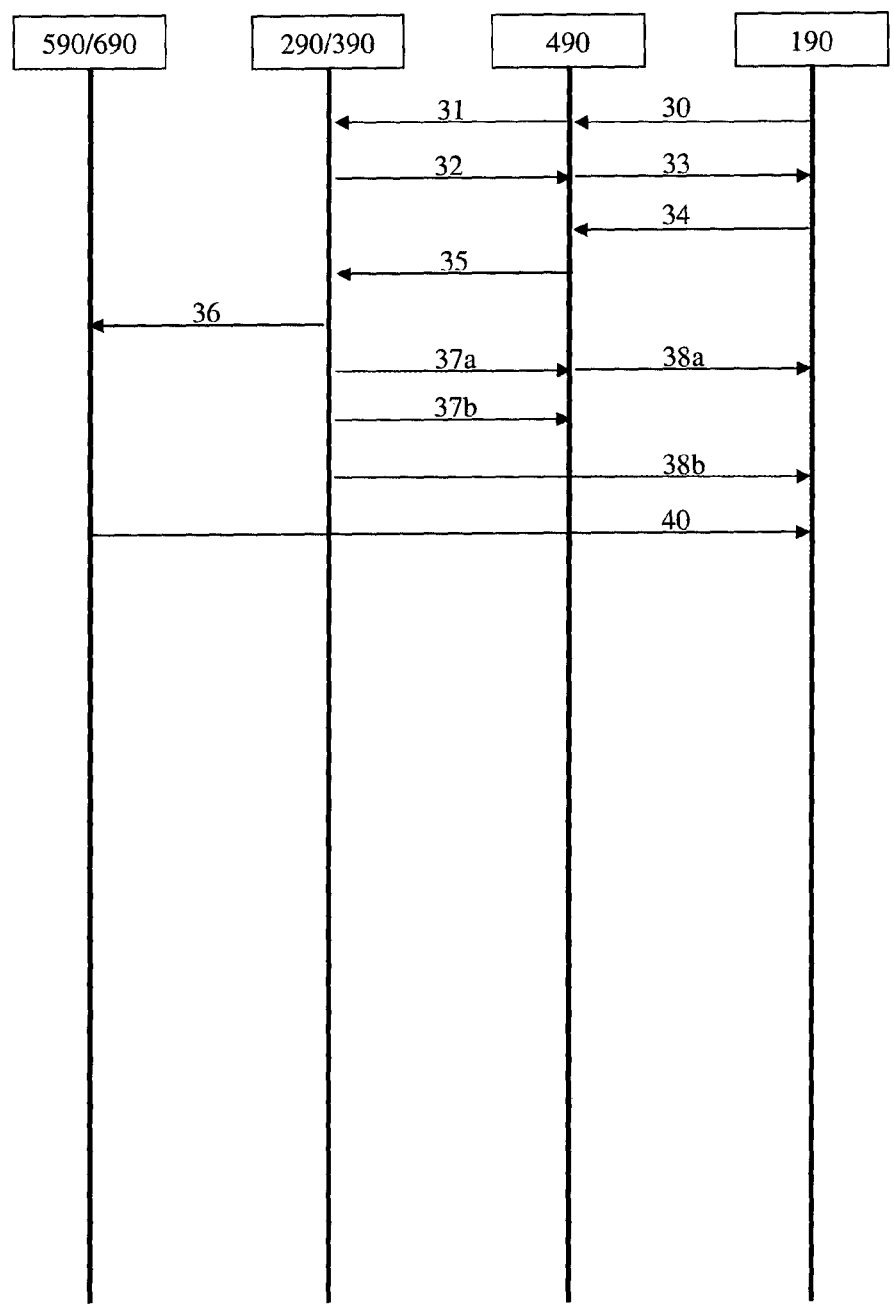
FIG. 8 shows a flowchart of the communication of servers/clients in an exemplary embodiment of the method according to the invention especially with respect to the communication with a credit card entity and/or bonus card entity.

FIG. 8 shows a flowchart of the communication of servers/clients 190, 290/390, 490, 590/690 in an exemplary embodiment of the method according to the invention especially with respect to the communication with a credit card entity and/or bonus card entity. In this embodiment the billing center acts as a gateway for the payment flow, only. A check-out message is sent from client 190 to server 490, as indicated by step 31. Triggered by the check-out message, server 490 sends a request on payment options to the server 290/390 (step 31). As indicated by step 32, the server of the online provider submits information on payment options, which options are forwarded the client 190, as indicated by step 33. The chosen options are submitted back to server 490 by client 190, as shown in step 34. Server 490 submits information on the chosen options as well as all relevant payment information, like e.g. credit card/bonus card number, user name, etc., back to server 290/390, as indicated by step 35.

Now, server 290/390 communicates directly with server 590/690 of the credit card entity and/or bonus system entity, as indicated by step 36, and transmits all relevant payment information, like e.g. credit card number/bonus card number, user name, article information for credit card statement, price, etc., to the servers 590/690. In step 37a a confirmation is sent from server 290/390 to server 490 of the billing center, which confirmation in step 38a is forwarded by server 490 to client 190. Alternatively, as indicated by steps 37b and 38b, server 290/390 sends separately confirmation information to server 490 (step 37b) and client 190 (step 38b). In step 40, the server 590/690 sends a statement information to client 190, indicating the purchase and accounted prices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of billing an online purchase of a user, comprising:
   a) detecting a first article selected by the user for a first online purchase at a first online provider;
   b) at least temporarily storing a first article data set associated to the first article in a first transmission data set associated to the first online provider;
   c) detecting a first check-out message of the user by means of which the user indicates intended completion of the first online purchase at the first online provider;
   d) detecting an identification input of the user for identification at a billing center;
   e) transmitting the first transmission data set associated to the first online provider to the billing center different from the first online provider;
   f) detecting a second article selected for second online purchase by the user at a second online provider;
   g) at least temporarily storing a second article data set associated to the second article in a second transmission data set associated to the second online provider:
   h) detecting a second check-out message of the user by means of which the user indicates intended completion of the second online purchase at the second online provider;
   i) transmitting the second transmission data set associated to the second online provider to the billing center different from the second online provider;
   j) detecting a final check-out message of the user by means of which the user indicates intended final completion of online purchasing;
   k) billing the first and the second online purchase with respect to the user by the billing center based on the first and second transmitted transmission data sets relating to the first and the second online provider; and
   l) billing the first and the second online purchase with respect to the first and the second online providers based on the first and second transmitted transmission data sets relating to the first and the second online provider, wherein
   with regard to d) the user registers once by specifying the identification input at the billing center and specifying a credit card account and a bonus system user account and
   the billing of the first and the second online purchases with respect to the user is implemented by the billing center by k2) debiting an amount of an official means of payment from the credit card account of the user and by
k3) debiting an amount of a bonus means of payment from the bonus system user account of the user, wherein the credit card account is associated to a credit card entity and the bonus system user account is associated to a bonus system entity, and
wherein with regard to k2) in billing the first and the second online purchase with respect to the user by the billing center by debiting an amount of an official means of payment from a credit card account of the user an official means of payment data set is transmitted from the billing center to the credit card entity and the credit card entity credits a corresponding amount of an official means of payment to a respective clearing account of the first and second online provider in accordance with the transmitted means of payment data set or the credit card entity credits a corresponding amount of an official means of payment to a respective clearing account of the billing center in accordance with the transmitted official means of payment data set, and
wherein with regard to k3) in billing the first and the second online purchases with respect to the user by the billing center by debiting an amount of a bonus means of payment from a bonus system user account of the user a bonus means of payment data set is transmitted from the billing center to the bonus system entity and the bonus system entity credits an amount of an official means of payment which corresponds to the billed amount of the bonus means of payment to a respective clearing account of the first and second online provider or the billing center on the basis of the transmitted bonus means of payment data set,
wherein with regard to a) the user makes a selection with respect to the first article to be purchased at the first online provider by means of a user terminal which is connected to a server of the first online provider over a packet-switched network;
with regard to c) after selecting the first article the user generates the first check-out message at the user terminal which is transmitted to a server of the billing center over the packet-switched network;
the server of the billing center generates a session identification which is transmitted to the server of the first online provider over the packet-switched network;
with regard to e) the server of the first online provider generates the first article data set with respect to the first article selected by the user and transmits this data set together with the session identification as the first transmission data set to the server of the billing center over the packet-switched network;
e2) the server of the billing center by transmission of the session identification over the packet-switched network initiates a generation of a superordinate user interface on the user terminal which at least comprises a final check-out button for initiating the final check-out message to the server of the billing center;
with regard to f) the user makes a selection with respect to the second article to be purchased at the second online provider by means of the user terminal which is connected to a server of the second online provider by the packet-switched network;
with regard to h) after selecting the second article the user generates the second check-out message at the user terminal which is transmitted to the server of the billing center over the packet-switched network;

the server of the billing center transmits the generated session identification to the server of the second online provider over the packet-switched network;
with regard to i) the server of the second online provider generates the second article data set with respect to the second article selected by the user and transmits this data set together with the session identification as the second transmission data set to the server of the billing center over the packet-switched network;
with regard to j) the user operates the final check-out button of the superordinate user interface generated on the user terminal in order to indicate intended final completion of online purchasing, whereby
j2) the final check-out message is transmitted from the user terminal to the server of the billing center over the packet-switched network;
with regard to k2) and k3) the server of the billing center transmits the means of payment data set and the bonus means of payment data set over the packet-switched network to a server of the credit card entity and a server of the bonus system entity, respectively;
and the server of the credit card entity and the server of the bonus system entity, respectively, initiates on the basis of the transmitted means of payment data set or the bonus means of payment data set, respectively, a credit entry of an amount of the official means of payment which represents a price of the selected articles in a clearing account, and
wherein the billing center after the transmission of the means of payment data set to the credit card entity and after the transmission of the bonus means of payment data set to the bonus system entity determines whether sufficient credit for billing exists prior to completing the first and second online purchase at step l) by receiving a feedback from the credit card entity and the bonus system entity indicating whether the credit card account has a sufficient credit line and the bonus system account of the user has a sufficient credit for billing the first and the second online purchase with respect to the user.

2. The method according to claim 1, wherein after detection of the first check-out message by the billing center articles selected during the first online purchase up to the point of detection of the first check-out message and articles selected during the second online purchase are indicated to the user in the superordinate user interface based on the first and second article data sets stored in the first and second transmission data sets associated to the first online provider and the second online provider.

3. The method according to claim 2, wherein an actual credit line of the credit card account and an actual credit of the bonus system user account is indicated to the user in the subordinate user interface.

4. The method according to claim 1, wherein the user specifies after the transmission of the final check-out message with respect to the billing center a partial amount of the billing of the online purchases should be charged from the credit card account and a partial amount of the online purchase should be charged from the bonus system user account.

5. The method according to claim 1, wherein after detection of the first check-out message of the user by the billing center the session identification is generated which is maintained during the first and second online purchases and which is transmitted to the first and second online provider, wherein the first and second transmission data sets relating to the first and second online provider, respectively, transmitted from the first and second online provider to the billing center includes the session identification.

6. The method according to claim 1, wherein at least the first and second transmission data sets relating to the first and second online provider, respectively, are transmitted between the first online provider and the billing center and the second online provider and the billing center encrypted by use of an encryption algorithm and the means of payment data set and the bonus means of payment data set are transmitted between the billing center and the credit card entity and the bonus system entity, respectively, encrypted by use of an encryption algorithm.

7. The method according to claim 1, wherein the server of the billing center comprises a data base in which information with respect to the credit card account and the bonus system user account of the user is stored together with a unique identification input for associating the respective means of payment data set and bonus means of payment data set to the credit card account and the bonus system user account of the user, respectively.

8. The method according to claim 7, wherein the data base includes information about a standard delivery address of the user to which one of the first or second articles is to be delivered and the server of the billing center transmits the standard delivery address to the server of the first online provider.

9. The method according to claim 1, wherein the server of the billing center after reception of the final check-out message initiates an inquiry to the server of the credit card entity and to the server of the bonus system entity in response to which the server of the billing center receives a feedback from the server of the credit card entity and the server of the bonus system entity indicating an actual credit line of the credit card account and a credit of the bonus system user account of the user, respectively, and the server of the billing center transmits this information to the user terminal for display in the superordinate user interface.

10. The method according to claim 1, wherein the first or second articles selected at the first or the second online provider are billed with respect to at least one further user, and wherein the method comprises the steps of: providing an overview of the first or second articles selected by the user at the first and the second online provider for the at least one further user by the billing center;

detecting an identification input of the at least one further user by the billing center;

detecting a selection of one of the first or second articles of the at least one further user from the overview and recording the selection of the article selected by the at least one further user in the transmission data set of the article selected by the further user from the overview;

detecting a further check-out message of the at least one further user;

deleting the article selected by the at least one further user from the overview; billing the article selected by the at least one further user by the billing center based on the transmitted transmission data set of the selected articles; wherein these steps are performed prior to the step of billing the online purchases with respect to the online providers based on the transmitted transmission data sets and subsequent to the step of detecting the final check-out message of the user by means of which the user indicates intended final completion of online purchasing.

11. The method according to claim 10, wherein the at least one further user registers once at the billing center by specifying an identification input and specifying a credit card account and a bonus system user account and the billing of the online purchases with respect to the at least one further user is implemented by the billing center by debiting an amount of an official means of payment from the credit card account of the at least one further user and by debiting an amount of a bonus means of payment from the bonus system user account of the at least one further user, wherein the credit card account of the at least one further user is associated to a credit card entity and the bonus system user account of the at least one further user is associated to a bonus system entity.

12. A computer program which, when implemented by a processor of a data processing device is configured to implement a method of billing an online purchase of an article by a user at an online provider according to claim 1.

\* \* \* \* \*